(12) United States Patent
Lukanc et al.

(10) Patent No.: US 6,662,258 B1
(45) Date of Patent: Dec. 9, 2003

(54) FLY-BY SUPPORT MODULE FOR A PERIPHERAL BUS

(75) Inventors: Jeffrey Lukanc, San Jose, CA (US); Jiann Liao, Campbell, CA (US); Cesar A. Talledo, Sunnyvale, CA (US)

(73) Assignee: Integrated Device Technology, Inc., Santa Clara, CA (US)

( * ) Notice: Subject to any disclaimer, the term of this patent is extended or adjusted under 35 U.S.C. 154(b) by 256 days.

(21) Appl. No.: 09/644,189

(22) Filed: Aug. 22, 2000

(51) Int. Cl.[7] .......................... G06F 13/36; G06F 13/28
(52) U.S. Cl. ............................ 710/308; 710/22; 710/28
(58) Field of Search ........................... 710/308, 22, 28

(56) References Cited

U.S. PATENT DOCUMENTS

| | | | | |
|---|---|---|---|---|
| 5,007,012 A | * | 4/1991 | Dujari | 710/22 |
| 5,416,916 A | * | 5/1995 | Bayle | 710/22 |
| 5,781,749 A | | 7/1998 | Le Quere | |
| 5,828,856 A | | 10/1998 | Bowes et al. | |
| 6,055,584 A | * | 4/2000 | Bridges et al. | 710/27 |

* cited by examiner

*Primary Examiner*—Tim Vo
(74) *Attorney, Agent, or Firm*—Bever, Hoffman & Harms LLP (57) ABSTRACT

A system is provided that includes a bus master, a bus slave and a fly-by slave interface, all coupled to a peripheral bus. A peripheral device is coupled to the fly-by slave interface. The bus master is configured to control fly-by transfer of data between the bus slave and the peripheral device without buffering the data. The fly-by slave interface is configured to isolate the peripheral device from the peripheral bus during fly-by transfer of data between the bus slave and the peripheral device. In addiction, the bus slave is configured to provide a set of control signals on the peripheral bus, wherein the control signals regulate the flow of data on the peripheral bus during fly-by transfer of data between the bus slave and the peripheral device. Fly-by transfers can be fully synchronous, and burst operation at the rate of one data value per clock cycle is supported.

34 Claims, 4 Drawing Sheets

FLY-BY SUPPORT MODULE FOR A PERIPHERAL BUS

FIELD OF THE INVENTION

The present invention relates to a module that provides fly-by support for a peripheral bus, which enables communication between master modules and slave modules. More specifically, the present invention relates to a module that enables a master module to control the direct transfer of data between a slave module and a fly-by slave module.

DISCUSSION OF RELATED ART

Figure 1:
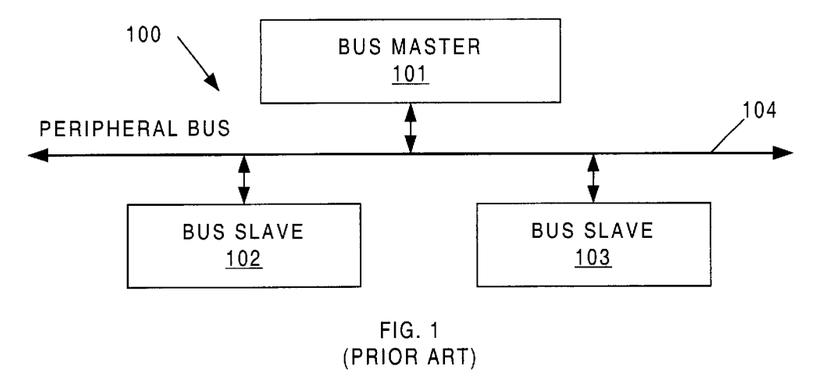
FIG. 1 is a block diagram of a conventional system having a bus master and bus slaves connected to a peripheral bus.

FIG. 1 is a block diagram of a prior art system 100 that includes a bus master 101, a first bus slave 102, a second bus slave 103 and a peripheral bus 104. Traditionally, bus master 101 transfers data from first bus slave 102 to second bus slave 103 as follows. First, bus master 101 reads the data from first bus slave 102. Bus master 101 then stores the data read from first bus slave 102. Subsequently, bus master 101 transfers the data to second bus slave 103. While this approach only requires the coordination of two devices (i.e., a master and a slave) at any given time, the time required to complete the entire data transfer is relatively long because all data must be routed through bus master 101. It would therefore be desirable to have a method for directly transferring data between two bus slaves under the control of a bus master.

SUMMARY

Accordingly, the present invention provides a high performance, fully synchronous system having a master device, a slave device and a fly-by slave device, each of which is coupled to a peripheral bus. The master device is configured to control the transfer of data directly between the slave device and the fly-by slave device without buffering the data.

To transfer data from the slave device to the fly-by slave device, the bus master initiates a read operation in the slave device, such that the slave device provides data on the peripheral bus under the control of the bus master. At the same time, the master device initiates a write operation in the fly-by slave device using a dedicated connection between the master device and the fly-by slave device. The fly-by slave device then snoops the data provided on the peripheral bus by the slave device. The fly-by slave device then performs a write operation using the data snooped from the peripheral bus. Advantageously, the master device does not have to buffer the data read from the slave device.

To transfer data from the fly-by slave device to the slave device, the master device initiates a read operation in the fly-by slave device using a dedicated connection between the master device and the fly-by slave device, such that the fly-by slave device provides data on the peripheral bus. At the same time, the master device initiates a write operation in the slave device, such that the data provided on the peripheral bus by the fly-by slave device is written directly to the slave device under the control of the master device. Again, the master device does not have to buffer the data read from the fly-by slave device.

In one embodiment, the transfer of data on the peripheral bus is fully synchronous, with burst transfers being supported. Other signals can be used to control the transfer of data between the slave device and the fly-by slave device on the peripheral bus. For example, the fly-by slave device can provide a control signal to the master device to indicate when it is ready to perform a read operation or a write operation. In addition, the master device can provide a control signal to identify the last transaction of a read or write operation.

In one embodiment, the master device is a DMA controller and the slave device is a memory controller. The fly-by slave device can be, for example, an Ethernet system, a universal serial bus (USB) system, a TDM peripheral, or an asynchronous transfer mode (ATM) system.

The present invention will be more fully understood in view of the following description and drawings.

DETAILED DESCRIPTION

Figure 2:
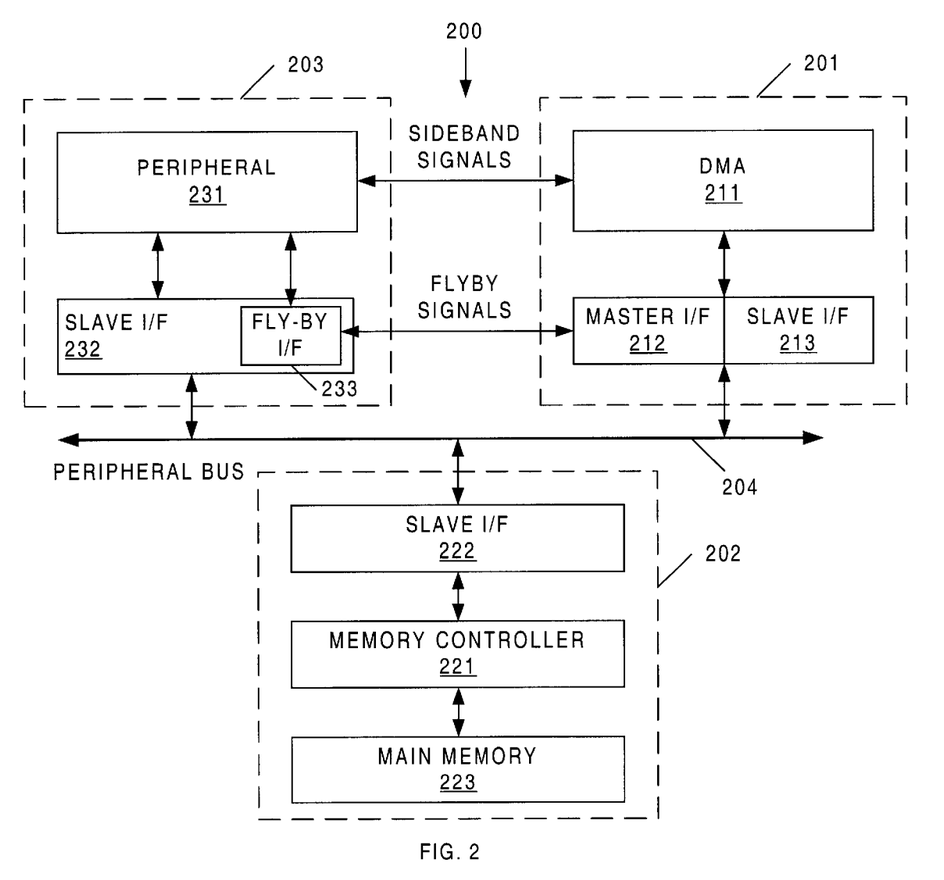
FIG. 2 is a block diagram of a system in accordance with the present invention.

FIG. 2 is a block diagram of a system 200 that includes a bus master 201, a bus slave 202, a fly-by bus slave 203 and a peripheral bus 204. In general, bus master 201 transfers data between the fly-by bus slave 203 and the bus slave 202 on the fly (i.e., without the bus master 201 having to buffer any data). As described in more detail below, bus master 201 puts addresses, commands and byte-enable signals on peripheral bus 204 during fly-by accesses. Bus slave 202 receives addresses, commands and byte-enable signals from bus master 201, and receives or drives data on peripheral bus 204 during fly-by accesses. Fly-by bus slave 203 puts data on peripheral bus 204 or grabs data and byte-enable signals from peripheral bus 204 during fly-by accesses.

In the described embodiment, bus master 201 includes a direct memory access (DMA) controller 211, a master interface 212 and a slave interface 213. DMA controller 211 is coupled to peripheral bus 204 through master interface 212 and slave interface 213. Bus slave 202 includes a memory controller 221, a slave interface 222 and a main memory 223. Memory controller 221 is coupled to peripheral bus 204 through slave interface 222. Fly-by bus slave 203 includes a peripheral device 231, a slave interface 232 and a fly-by interface 233. Fly-by bus slave 203 is coupled to peripheral bus 204 through slave interface 232 (which includes fly-by slave interface 233).

In general, peripheral bus 204 only supports the involvement of one slave at a time. Consequently, an additional mechanism is provided for fly-by transfers. This mechanism requires a dedicated set of signals for control. These signals are point-to-point signals from master interface 212 to fly-by slave interface 233. These dedicated signals are hereinafter referred to as fly-by signals. Thus, during fly-by, bus master 201 can talk to bus slave 202 through peripheral bus 204, and at the same time talk to fly-by bus slave 203 through the dedicated fly-by signals. In this way, bus master 201 can coordinate between bus slave 202 and fly-by bus slave 203 in order to perform data transfers across these slave devices.

Bus master 201 need only indicate to fly-by bus slave 203 that a read/write transfer is to be performed. In response, fly-by bus slave 203 will monitor peripheral bus 204 and either snoop data and byte enable information from peripheral bus 204, or place data on peripheral bus 204.

Other point-to-point connections are provided to enable sideband signals to be transmitted between DMA controller 211 and peripheral device 231. It is noted that peripheral device 231 can be one of many types of peripherals, such as an ethernet device, a USB device, a TDM device or an ATM device. The particular sideband signals exchanged between DMA controller 211 and peripheral device 231 are dependent on the particular characteristics of peripheral device 231 (and DMA controller 211). Because the specific sideband signals used by a particular peripheral device and DMA are understood by the designer of the peripheral device 231 and DMA controller 211, these sideband signals are not described in detail herein. These signals only provide information identifying the nature of the transfer requested by the peripheral but do not affect the ongoing transfer.

Fly-by slave interface 233 provides an interface between peripheral device 231 and peripheral bus 204 during fly-by transfers. Fly-by slave interface 233 is located inside slave interface 232, and allows slave interface 232 to engage in fly-by transfers through peripheral bus 204. Including fly-by slave interface 233 in slave interface 232 advantageously isolates peripheral device 231 from peripheral bus 204 during fly-by transfers. As a result, the peripheral device 231 is not involved in protocol complications on peripheral bus 204, such as monitoring acknowledge signals on peripheral bus 204 during a fly-by operation. In addition, by integrating the fly-by interface 233 into slave interface 232, fly-by transfers are introduced into the protocol of peripheral bus 204.

Figure 3:
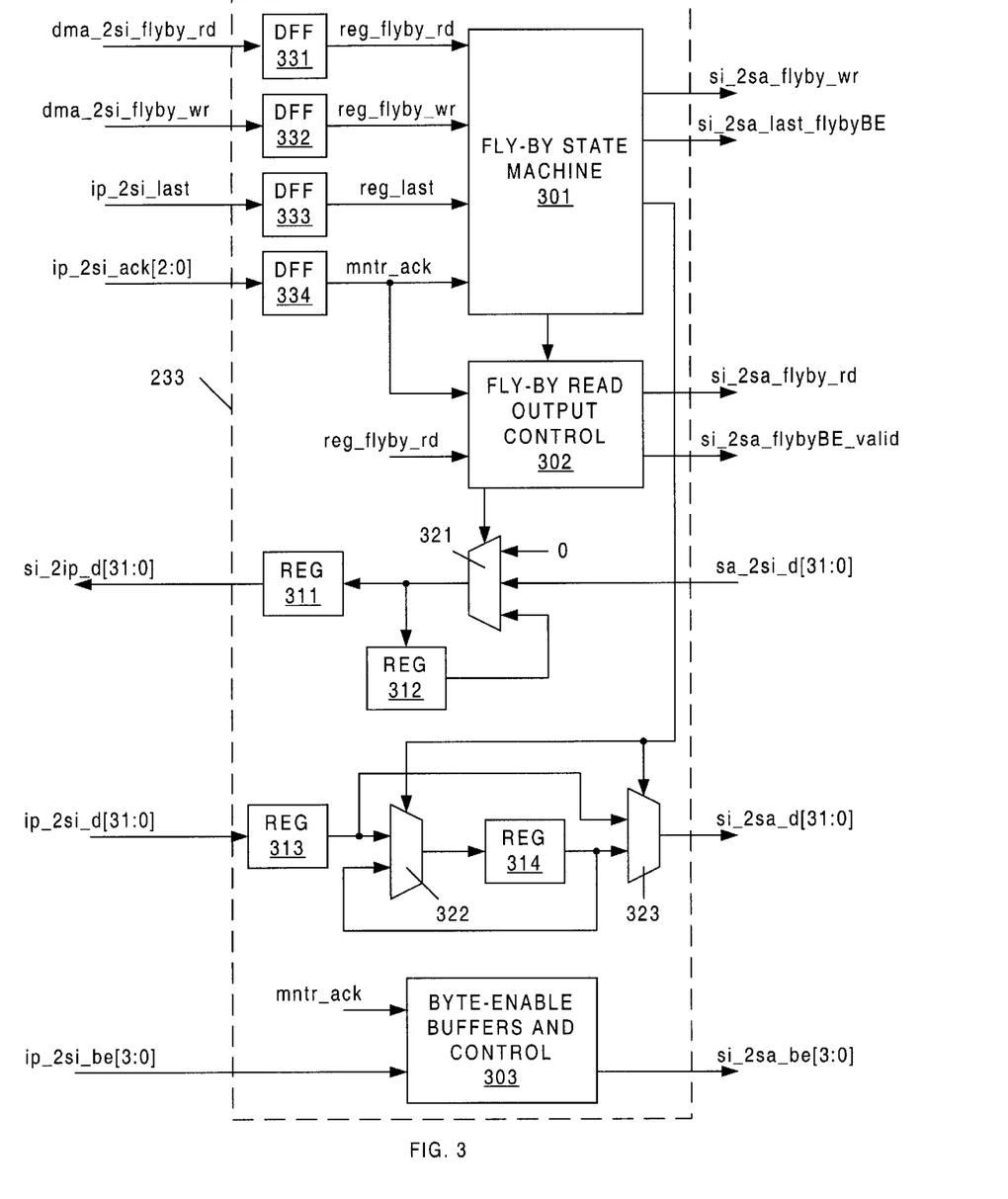
FIG. 3 is a block diagram of hardware required to implement a fly-by slave interface to enable fly-by transfers in accordance with one embodiment of the present invention.

FIG. 3 is a block diagram of hardware required to implement fly-by slave interface 233 inside slave interface 232 to enable fly-by transfers in accordance with one embodiment of the present invention. Fly-by slave interface 233 includes fly-by state machine 301, fly-by read output controller 302, byte-enable buffer/controller 303, registers 311–314, multiplexers 321–323, and D flip-flops 331–334. In general, the signals in FIG. 3 are labeled using the following notation: X_2Y_Z, where X identifies the origin of the signal, Y identifies the destination of the signal, and Z identifies the signal type. The following abbreviations are used: "dma" identifies DMA controller 211, "si" identifies slave interface 222 or 232, "ip" identifies peripheral bus 204, "sa" identifies peripheral device 231. Thus, the "dma_2si_flyby_rd" signal is a flyby read enable signal (Z=flyby_rd) that originates in DMA controller 211 (X=dma) and is transmitted to (2) the slave interface 232 (Y=si). Tables 1 and 2 below describe the signals used by fly-by slave interface 233 during fly-by transfers. Table 1 describes the signals on the peripheral bus side of slave interface 232. Table 2 describes the signals on the peripheral side of slave interface 232. For the purposes of this disclosure, a fly-by read operation is defined as an operation that reads from peripheral device 231 and writes to memory controller 221. A fly-by write operation is defined as an operation that reads from memory controller 221 and writes to peripheral device 231. In Tables 1 and 2, the term "p-to-p" means "point-to-point", and the term "I/F" means "interface".

TABLE 1

SIGNALS ON THE SIDE OF PERIPHERAL BUS 204

| SIGNAL | WIDTH | DRIVEN BY | RECEIVED BY | TYPE | DESCRIPTION |
| --- | --- | --- | --- | --- | --- |
| dma_2si_flyby_rd | 1 | DMA 211 | Slave I/F 232 | p-to-p | Indicates that a fly-by read transfer has been initiated by DMA controller 211 |
| dma_2si_flyby_wr | 1 | DMA 211 | Slave I/F 232 | p-to-p | Indicates that a fly-by write transfer has been initiated by DMA controller 211 |
| ip_2si_last | 1 | Bus logic | Slave I/F 232 | Bus signal | Indicates that master 201 is issuing last operation of transfer |
| ip_2si_ack[2:0] | 3 | Slave 221 | Slave I/F 232 | Bus signal | Encodes the acknowledge placed on bus 204 by slave 221 |
| ip_2si_d[31:0] | 32 | Bus logic | Slave I/F 232 | Bus signal | Data grabbed by fly-by slave I/F 233 |
| ip_2si_be[3:0] | 4 | Bus logic | Slave I/F 232 | Bus signal | Byte-Enables grabbed by fly-by slave I/F 233 |
| si_2ip_d[31:0] | 32 | Slave I/F 232 | Bus logic | Bus signal | Data driven by fly-by slave I/F 233 |

TABLE 1

SIGNALS ON THE SIDE OF PERIPHERAL DEVICE 231

| SIGNAL | WIDTH | DRIVEN BY | RECEIVED BY | TYPE | DESCRIPTION |
| --- | --- | --- | --- | --- | --- |
| si_2sa_flyby_rd | 1 | Slave I/F 232 | 231 | p-to-p | Indicates to peripheral device 231 that a fly-by read transfer is in progress. Peripheral device 231 shall drive fly-by data to slave I/F 232. |

TABLE 1-continued

SIGNALS ON THE SIDE OF PERIPHERAL DEVICE 231

| SIGNAL | WIDTH | DRIVEN BY | RECEIVED BY | TYPE | DESCRIPTION |
|---|---|---|---|---|---|
| si_2sa_flyby_wr | 1 | Slave I/F 232 | 231 | p-to-p | Indicates to peripheral device. 231 that a fly-by write transfer is in progress. Peripheral device 231 shall register fly-by data and byte-enables from the slave I/F 232. |
| si_2sa_flybyBE_valid | 1 | Slave I/F 232 | 231 | p-to-p | Indicates to peripheral device 231 that the lines 'si_2sa_be[3:0]' are being driven with byte-enables snooped from peripheral bus 204. |
| si_2sa_last_flybyBE | 1 | Slave I/F 232 | 231 | p-to-p | Indicates to peripheral device 231 that the current byte-enables being driven on 'si_2sa_be[3:0]' are the last byte-enables placed on peripheral bus 204 by master 211. |
| si_2sa_d[31:0] | 32 | Slave I/F 232 | 231 | p-to-p | Data that peripheral device 231 shall register during fly-by write transfers. |
| si_2sa_be[3:0] | 4 | Slave I/F 232 | 231 | p-to-p | Byte-Enables that peripheral device 231 shall register during fly-by write transfers. Indicates which byte lanes contain valid data. |
| sa_2si_d[31:0] | 32 | 231 | Slave I/F 232 | p-to-p | Data that peripheral device 231 shall drive during fly-by read transfers. |

Fly-By Write

Figure 4:
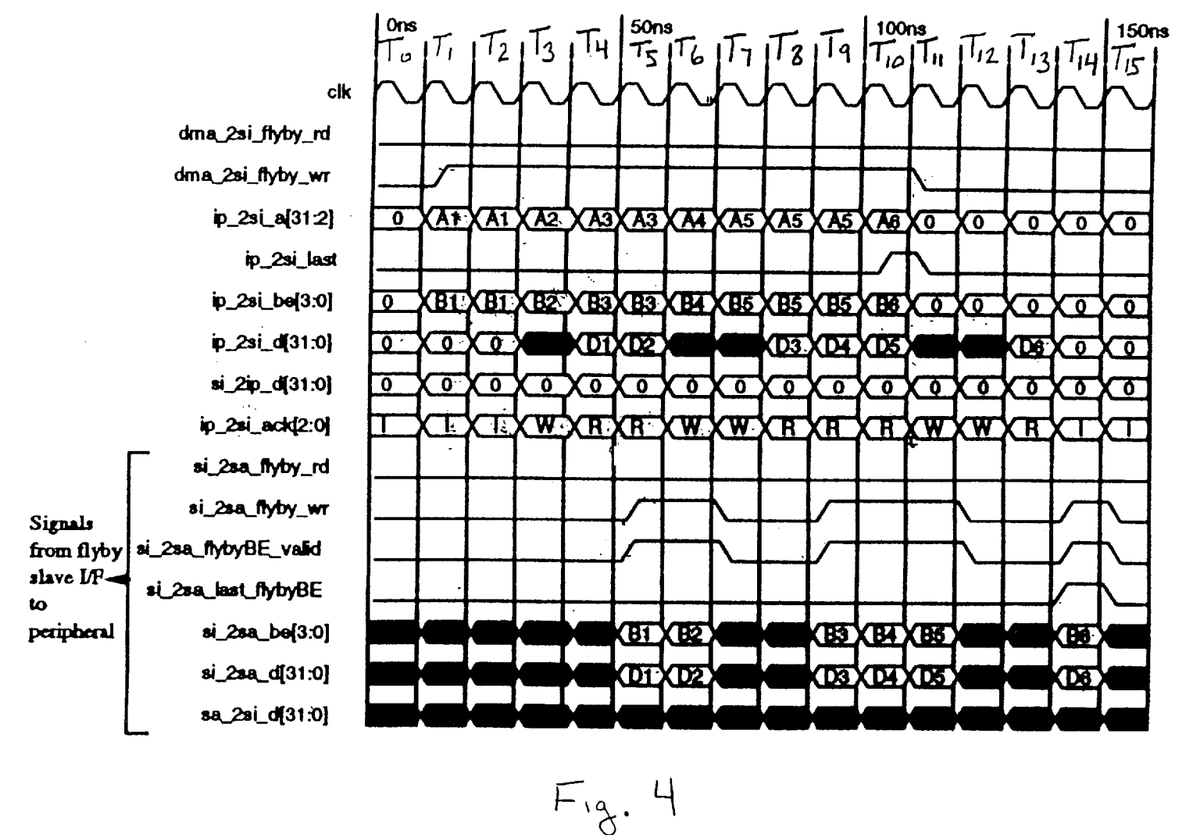
FIG. 4 is a waveform diagram illustrating a fly-by write transfer of six data values in accordance with one embodiment of the present invention.

A fly-by write operation will now be described. FIG. 4 is a waveform diagram illustrating a fly-by write transfer of six data values D1–D6 in accordance with one embodiment of the present invention. The following sequence of events occurs in accordance with the waveform diagram of FIG. 4. During clock cycle T1, master interface 212 asserts the dedicated point-to-point fly-by signal, dma_2si_flyby_wr. Master interface 212 continues to assert the dma_2si_flyby_wr signal for the duration of the fly-by write operation.

Also during cycle T1, master interface 212 drives the first address ip_2si_a[31:2] (A1) and the first byte enable signal (B1) ip_2si_be[3:0] of the fly-by write operation onto peripheral bus 204. The first address (A1) and first byte enable signal (B1) are selected to access slave device 202. Master interface 212 further provides a separate bus control signal ip_2si_rd_wr_n (not shown) on peripheral bus 204 to indicate that the current access of slave device 202 is a read operation.

On the rising edge of clock cycle T2, the asserted dma_2si_flyby_wr signal is latched into flip-flop 332 of fly-by slave interface 233, and is provided to fly-by state machine 301 as a registered signal reg_flyby_wr. In response, fly-by slave interface 233 monitors peripheral bus 204, and grabs data (ip_2si_d[31:0]) from this bus 204 when the acknowledge signal (ip_2si_ack[2:0]) on peripheral bus 204 identifies a READY (R) state. Fly-by slave interface 233 also monitors peripheral bus 204 for byte-enable signals (ip_2si_be[3:0]), and buffers these byte-enable signals in a manner described below.

In accordance with the protocol of peripheral bus 204, master interface 212 continues to provide the first address A1 and the first byte enable signal B1 on peripheral bus 204 during the second clock cycle T2. This provides slave device 202 with adequate time to register and decode the address. The first byte enable signal B1 is stored in byte-enable buffer/controller 303 at the rising edges of cycles T2 and T3.

During cycle T3, master interface 212 drives a second address ip_2si_a[31:2] (A2) and a second byte enable signal (B2) ip_2si_be[3:0] of the fly-by write operation onto peripheral bus 204. The second address (A2) and second byte enable signal (B2) are selected to access slave device 202. The second address A2 and the second byte enable signal B2 are registered into slave device 202 at the rising edge of clock cycle T4. The second byte enable signal B2 is also stored in byte-enable buffer/controller 303 at the rising edge of clock cycle T4.

Also during cycle T3, slave device 202 retrieves data from memory 223, and asserts a WAIT (W) acknowledge signal ip_2si_ack[2:0] on peripheral bus 204, thereby indicating that data is not yet available (due to memory latencies).

During cycle T4, master interface 212 drives a third address ip_2si_a[31:21] (A3) and a third byte enable signal (B3) ip_2si_be[3:0] of the fly-by write operation-onto peripheral bus 204. The third address (A3) and third byte enable signal (B3) are selected to access slave device 202. The third address A3 and the third byte enable signal B3 are latched into slave device 202 at the rising edge of clock cycle T5. The third byte enable signal B3 is also stored in byte-enable buffer/controller 303 at the rising edge of clock cycle T5.

Also during cycle T4, slave device 202 provides an output data signal ip_2si_d[31:0] (D1) associated with first address A1 and first byte enable signal B1 on peripheral bus 204. Slave device 202 also asserts a READY (R) acknowledge signal ip_2si_ack[2:0] on peripheral bus 204 during cycle T4.

At the rising edge of cycle T5, the READY acknowledge signal is latched into flip-flop 334 of fly-by slave interface 233. As a result, fly-by slave 203 has a full cycle to decode the acknowledge signal and respond accordingly. Also at the rising edge of cycle T5, the data signal D1 is latched into register 313 of fly-by slave interface 233.

During cycle T5, fly-by state machine 301 asserts the fly-by write enable signal si_2sa_flyby_wr (in response to the asserted mntr_ack signal), thereby indicating to peripheral device 231 that write data has been snooped from peripheral bus 204, and is stored in register 313. Fly-by state machine 301 also controls multiplexers 322 and 323 to route the data value D1 from register 313 to peripheral device 231 as the si_2sa_d[31:0] signal. Also during cycle T5, byte-enable buffer/controller 303 provides the first byte enable signal B1 to peripheral device as the si_2sa_be[3:0] signal. Fly-by state machine 301 also asserts the si_2sa_flybyBE_valid signal to indicate that the byte enable signal B1 provided by byte-enable buffer/controller 303 is valid. In response, the first data value D1 read from slave device 202 is written to peripheral device 231. Advantageously, master interface 212 does not need to buffer the first data value D1.

Also during cycle T5, master interface 212 continues to drive the third address (A3) and the third byte enable signal (B3) onto peripheral bus 204. Master interface 212 operates in this manner in response to the WAIT acknowledge signal ip_2si_ack[2:0] that was asserted in cycle T3 and registered in cycle T4. In addition, slave device 202 provides an output data value ip_2si_d[31:0] (D2) associated with second address A2 and second byte enable signal B2 on peripheral bus 204. Slave device 202 also asserts another READY acknowledge signal (ip_2si_ack[2:0]) on peripheral bus 204 during cycle T5.

At the rising edge of cycle T6, the READY acknowledge signal is latched into flip-flop 334 of fly-by slave interface 233. Also at the rising edge of cycle T6, the data signal D2 is latched into register 313 of fly-by slave interface 233.

During cycle T6, fly-by state machine 301 continues to assert the fly-by write enable signal si_2sa_flyby_wr (in response to the asserted mntr_ack signal), thereby indicating to peripheral device 231 that another write data value D2 has been snooped from peripheral bus 204, and is stored in register 313. Fly-by state machine 301 also controls multiplexers 322 and 323 to route the data value D2 from register 313 to peripheral device 231 as the si_2sa_d[31:0] signal. Also during cycle T6, byte-enable buffer/controller 303 provides the second byte enable signal B2 to peripheral device as the si_2sa_sa[3:0] signal. Fly-by state machine 301 also continues to assert the si_2sa_flybyBE_valid signal (in response to the asserted mntr_ack signal) to indicate that the byte enable signal B2 provided by byte-enable buffer/controller 303 is valid. The byte enable signals identify which of the data bytes of the word D are valid. In response, the second data value D2 read from slave device 202 is written to peripheral device 231.

Also during cycle T6, master interface 212 drives a fourth address (A4) and a fourth byte enable signal (B4) onto peripheral bus 204. In addition, slave device 202 asserts a WAIT acknowledge signal ip_2si_ack[2:0] on peripheral bus 204.

At the rising edge of cycle T7, the WAIT acknowledge signal is latched into flip-flop 334 of fly-by slave interface 233. In response, flip-flop 334 de-asserts the mntr_ack signal to fly-by state machine 301, fly-by read output controller 302 and byte-enable buffer/controller 303. In response, fly-by state machine 301 de-asserts the si_2sa_flyby_wr signal, and fly-by read output controller 302 de-asserts the si_2sa_flybyBE_valid signal. As a result, peripheral device 231 does not perform a write operation during cycle T7.

During cycle T7, master interface 212 drives a fifth address (A5) and a fifth byte enable signal (B5) onto peripheral bus 204. Also during cycle T7, slave device 202 asserts another WAIT acknowledge signal ip_2si_ack[2:0] on peripheral bus 204. Note that the acknowledge signals ip_2si_ack[2:0] of the present example have been chosen to illustrate the flexibility of transfers within the present system, but do not represent a typical transfer. A typical transfer would include a fully synchronous burst access.

During cycle T8, master interface 212 continues to drive the fifth address A5 and the fifth byte enable signal B5 onto peripheral bus 204. Also during cycle T8, slave device 202 drives a third data value D3, which is associated with third address A3 and third byte enable signal B3, onto peripheral bus 204. Slave device 202 also asserts a READY acknowledge signal onto peripheral bus 204.

At the rising edge of cycle T9, the READY acknowledge signal is latched into flip-flop 334, thereby causing the mntr_ack, si_2sa_flyby_wr and si_2sa_flybyBE_valid signals to be asserted. In addition, the rising edge of cycle T9 causes the third data value D3 to be latched into register 313 of fly-by slave interface 233. During cycle T9, the third data value D3 and the third byte enable signal B3 are routed to peripheral device 231. At this time, the third data value D3 is written to peripheral device 231.

Also during cycle T9, master interface 212 continues to drive fifth address A5 and fifth byte enable signal B5 onto peripheral bus 204. In addition, slave device 202 drives a fourth data value D4, which is associated with fourth address A4 and fourth byte enable signal B4, onto peripheral bus 204. Slave device 202 also asserts another READY acknowledge signal onto peripheral bus 204. At the rising edge of cycle T10, the READY acknowledge signal is latched into flip-flop 334, thereby causing the mntr_ack, si_2sa_flyby_wr and si_2sa_flybyBE_valid signals to remain asserted. In addition, the rising edge of cycle T10 causes the fourth data value D4 to be latched into register 313 of fly-by slave interface 233. During cycle T10, the fourth data value D4 and the fourth byte enable signal B4 are routed from fly-by slave interface 233 to peripheral device 231. At this time, the fourth data value D4 is written to peripheral device 231.

Also during cycle T10, master interface 212 drives a sixth address (A6) and a sixth byte enable signal (B6) onto peripheral bus 204. Master interface 212 also asserts the ip_2si_last signal to indicate that the current address (A6) is the last address of the transfer. In addition, slave device 202 drives a fifth data value D5, which is associated with fifth address A5 and fifth byte enable signal B5, onto peripheral bus 204. Slave device 202 also asserts a READY acknowledge signal onto peripheral bus 204.

Also during cycle T10, master interface 212 asserts the ip_2si_last signal on peripheral bus 204, thereby indicating to slave device 202 that the sixth address A6 is the last address of the fly-by write operation. At the rising edge of cycle T11, DMA controller 211 de-asserts the dma_2si_flyby_wr signal, thereby indicating to fly-by slave device 203 that DMA controller 211 has sent the last address of the fly-by write operation. At the rising edge of cycle T11, the READY acknowledge signal is latched into flip-flop 334, thereby causing the mntr_ack, si-2sa_flyby_wr and si_2sa_flybyBE_valid signals to remain asserted. In addition, the rising edge of cycle T11 causes the fifth data value D5 to be latched into register 313 of fly-by slave interface 233. During cycle T11, the fifth data value D5 and the fifth byte enable signal B5 are routed from fly-by slave interface 233 to peripheral device 231. At this time, the fifth data value D5 is written to peripheral device 231.

Also during cycle T11, slave device 202 asserts a WAIT acknowledge signal ip_2si_ack[2:0] on peripheral bus 204. At the rising edge of cycle T12, the WAIT acknowledge signal is latched into flip-flop 334 of fly-by slave interface 233. In response, flip-flop 334 de-asserts the mntr_ack signal to fly-by state machine 301, fly-by read output controller 302 and byte-enable buffer/controller 303. In response, fly-by state machine 301 de-asserts the si_2sa_flyby_wr signal, and fly-by read output controller 302 de-asserts the si_2sa_flybyBE_valid signal. As a result, peripheral device 231 does not perform a write operation during cycle T12.

Slave device 202 continues to assert the WAIT acknowledge signal on peripheral bus 204 during cycle T12. As a result, peripheral device 231 does not perform a write operation during cycle T13.

During cycle T13, slave device 202 drives a sixth data value D6, which is associated with the sixth address A6 and the sixth byte enable signal B6, onto peripheral bus 204. Slave device 202 also asserts a READY acknowledge signal onto peripheral bus 204 during cycle T13. At the rising edge of cycle T14, the READY acknowledge signal is latched into flip-flop 334, thereby causing the mntr_ack, si_2sa_flyby_wr and si_2sa_flybyBE_valid signals to be asserted. In addition, the rising edge of cycle T14 causes the sixth data value D6 to be latched into register 313 of fly-by slave interface 233. During cycle T14, the sixth data value D6 and the sixth byte enable signal B6 are routed to peripheral device 231. Meanwhile, the si_2sa_last_flybyBE_signal is asserted to indicate the end of the fly-by write operation. At this time, the sixth data value D6 is written to peripheral device 231. This completes the fly-by write operation.

Note that in the described example, the write operations to peripheral device 231 do not occur on consecutive clock cycles, because slave device 202 issues WAIT acknowledge signals. However, it is understood that if slave device 202 is ready, then data values can be written to peripheral device 231 during consecutive clock cycles.

Fly-By Read

Figure 5:
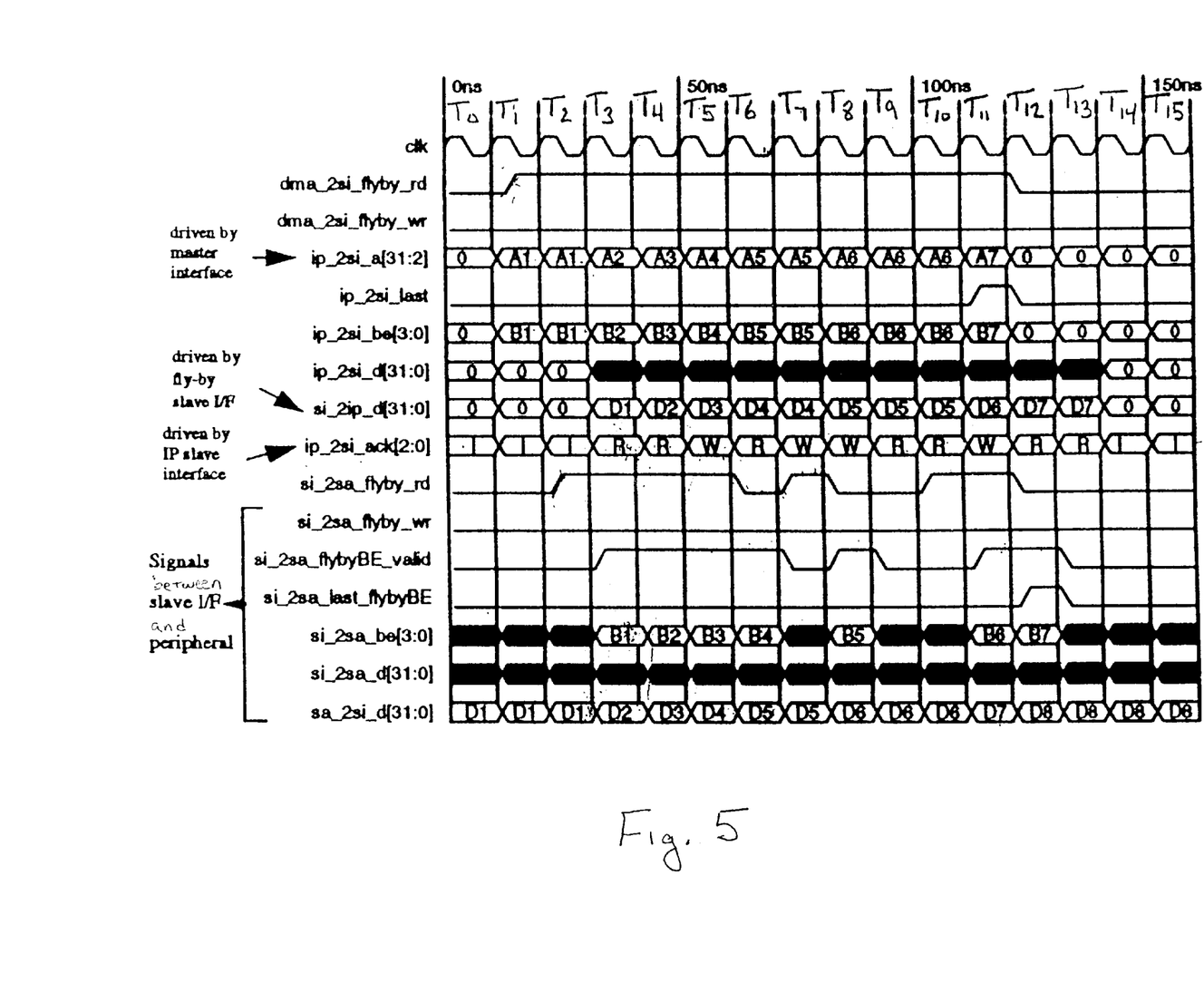
FIG. 5 is a waveform diagram illustrating a fly-by read transfer of seven data values in accordance with one embodiment of the present invention.

A fly-by read operation will now be described. FIG. 5 is a waveform diagram illustrating the a fly-by read transfer of seven data values D1–D7 in accordance with one embodiment of the present invention. The following sequence of events occurs in accordance with the waveform diagram of FIG. 5.

During clock cycle T1, master interface 212 asserts the dedicated point-to-point fly-by signal, dma_2si_flyby_rd, thereby indicating to fly-by slave device 203 that a fly-by read operation is being initiated. Master interface 212 continues to assert the dma_2si_flyby_rd signal for the duration of the fly-by read operation. Also during cycle T1, master interface 212 drives a first address ip_2si_a[31:2] (A1) and a first byte enable signal (B1) ip_2si_be[3:0] of the fly-by read operation onto peripheral bus 204. The first address (A1) and first byte enable signal (B1) are selected to access an address in slave device 202, because data values are written to slave device 202 during the fly-by read operation. Master interface 212 further provides a separate control bus signal ip_2si_rd_wr_n (not shown) on peripheral bus 204 to 12 indicate to slave device 202 that the current access will be a write operation with respect to slave device 202. Fly-by slave peripheral 231 provides the first data value D1 to fly-by slave interface 232 as the sa_2si_d[31:0] signal during cycle T1.

On the rising edge of clock cycle T2, the asserted dma_2si flyby_rd signal is latched into flip-flop 331 of fly-by slave interface 233, and is provided to fly-by state machine 301 as a registered signal, reg_flyby_rd. In response to the asserted reg_flyby_rd signal, fly-by read output controller 302 asserts the si_2sa_flyby_rd signal. Fly-by read output controller 302 will de-assert the si_2sa_flyby_rd signal in response to a WAIT acknowledge signal detected on peripheral bus 204, or when master interface 212 de-asserts the dma_2si_flyby_rd signal at the end of the fly-by read operation. If the si_2sa_flyby_rd signal is de-asserted in response to a detected WAIT acknowledge signal, the si_2sa_flyby_rd signal will be re-asserted in response to a detected READY acknowledge signal (assuming that the dma_2si_flyby_rd signal is still asserted). As described in more detail below, the si_2sa_flyby_rd signal is used to control multiplexer 321 in fly-by slave interface 233. In accordance with the protocol of peripheral bus 204, master interface 212 continues to provide the first address A1 and the first byte enable signal B1 on peripheral bus 204 during the clock cycle T2. While the si_2sa_flyby_rd signal is asserted, fly-by read output controller 302 causes multiplexer 321 to route the first data value D1 from peripheral device 231 to register 311. At the rising edge of cycle T3, the first data value D1 is latched into register 311.

Fly-by read output controller 302 generates the si_2sa_flybyBE_valid signal such that this signal lags the si_2sa_flyby_rd signal by one clock cycle. Thus, at the rising edge of cycle T3, fly-by read output controller 302 asserts the si_2sa_flybyBE_valid signal, thereby indicating that the byte enable signal provided by byte-enable buffer/controller 303 is valid.

During cycle T3, the first data value D1 is provided to slave device 202 as the si_2ip_d[31:0] signal. At this time, the first data value D1 is written to the first address A1 at the byte location(s) identified by first byte-enable signal B1 in slave device 202.

In addition, byte-enable buffer/controller 303 provides the first byte-enable signal B1 to peripheral device 231. Peripheral device 231 monitors the received byte enable signals to maintain a count of the number of bytes transferred in the fly-by read operation. During the fly-by read operation, master interface 212 specifies the number of bytes transferred in the fly-by read operation through the byte enable signal ip_2si_be[3:01]. Peripheral device 231 keeps track of the number of bytes transferred until it detects the assertion of the si_2sa_last_flybyBE signal, which indicates that the transfer is complete. The assertion of the si_2sa_flyby_rd signal in cycle T2 indicates to peripheral 231 that data D1 has been accepted and that data D2 should be provided in the next cycle. Peripheral device 231 provides the second data value D2 as the sa_2si_d[31:0] signal during cycle T3. In addition, master interface 212 provides a second address A2 and a second byte-enable signal B2 on peripheral bus 204. The second address A2 and the second byte-enable signal B2 are latched by slave device 202 at the rising edge of cycle T4.

Also during the third cycle T3, slave device 202 provides a READY acknowledge signal, thereby indicating that slave device 202 is ready to receive the next data value. At the rising edge of cycle T4, the READY acknowledge signal is latched by flip-flop 334 and routed to fly-by read output controller 302 as the mntr_ack signal. In response to the asserted mntr_ack signal, fly-by read output controller 302 maintains the si_2sa_flyby_rd signal at a logic high state.

As a result, multiplexer 321 continues to route the si_2sa_d[31:0] signal to register 311. In addition, fly-by read output controller 302 continues to assert the si_2sa_flybyBE_valid signal, thereby indicating that the byte enable signal provided by byte-enable buffer/controller 303 is valid.

At the rising edge of the cycle T4, the si_2sa_d[31:0] signal is equal to the second data value D2. As a result, the second data value D2 is latched into register 311 at the rising edge of cycle T4. Thus, during cycle T4, the second data value D2 is provided to slave device 202. At the rising edge of cycle T5, the second data value D2 is written to the second address A2 at the byte location(s) identified by byte-enable signal B2 in slave device 202. In addition, byte-enable buffer/controller 303 provides the second byte-enable signal B2 to peripheral device 231, thereby enabling peripheral device 231 to update the byte count.

Due to the assertion of the si_2sa_flyby_rd signal during cycle T3, peripheral device 231 provides the third data value D3 as the sa_2si_d[31:0] signal during cycle T4. In addition, master interface 212 provides a third address A3 and a third byte-enable signal B3 on peripheral bus 204. The third address A3 and the third byte-enable signal B3 are latched by slave device 202 at the rising edge of cycle T5.

Also during cycle T4, slave device 202 provides a READY acknowledge signal, thereby indicating that slave device 202 is ready to receive the next data value. At the rising edge of cycle T5, the READY acknowledge signal is latched by flip-flop 334 and routed to fly-by read output controller 302 as the mntr_ack signal. In response to the asserted mntr_ack signal, fly-by read output controller 302 maintains the si_2sa_flyby_rd signal at a logic high state. As a result, multiplexer 321 continues to route the si_2sa_d[31:0] signal to register 311. In addition, fly-by read output controller 302 continues to assert the si_2sa_flybyBE_valid signal, thereby indicating that the byte enable signal provided by byte-enable buffer/controller 303 is valid.

At the rising edge of cycle T5, the si_2sa_d[31:0] signal is equal to the third data value D3. As a result, the third data value D3 is latched into register 311 at the rising edge of cycle T5. Thus, during cycle T5, the third data value D3 is provided to slave device 202. At the rising edge of cycle T6, the third data value D3 is written to third address A3 at the byte location(s) identified by byte-enable signal B3 in slave device 202.

In addition, byte-enable buffer/controller 303 provides the third byte-enable signal B3 to peripheral device 231, thereby enabling peripheral device 231 to update the byte count.

Due to the assertion of the si_2sa_flyby_rd signal during cycle T4, peripheral device 231 provides the fourth data value D4 as the sa_2si_d[31:0] signal during cycle T5. At the rising edge of cycle T6, the si_2sa d[31:0] signal is therefore equal to the fourth data value D4. As a result, the fourth data value D4 is latched into register 311 (and register 312) at the rising edge of cycle T6.

In addition, master interface 212 provides a fourth address A4 and a fourth byte-enable signal B4 on peripheral bus 204 during cycle T5. The fourth address A4 and the fourth byte-enable signal B4 are latched by slave device 202 at the rising edge of cycle T6.

Also during cycle T5, slave device 202 provides a WAIT acknowledge signal, thereby indicating that slave device 202 is not ready to accept the next data value. At the rising edge of cycle T6, the WAIT acknowledge signal is latched by flip-flop 334 and routed to fly-by read output controller 302 as the mntr_ack signal. In response to the de-asserted mntr_ack signal, fly-by read output controller 302 causes the si_2sa_flyby_rd signal to transition to a logic low state.

During cycle T6, the fourth data value D4 is provided to slave device 202. However, because slave device 202 is not ready to receive data during this cycle, the fourth data value D4 is ignored by slave device during cycle T6. Fly-by read output controller 302 continues to assert the si_2sa_flybyBE_valid signal during cycle T6, thereby indicating that the byte enable signal provided by byte-enable buffer/controller 303 is valid. Thus, at the rising edge of cycle T6, peripheral device 231 latches the fourth byte-enable signal B4, and uses this byte-enable signal B4 to update the byte count. As described below, slave device 202 will use the fourth byte-enable signal B4 when it is ready to receive the fourth data value D4.

Due to the assertion of the si_2sa_flyby_rd signal during cycle T5, peripheral device 231 provides the fifth data value D5 as the sa_2si_d[31:0] signal during cycle T6. However, at the rising edge of cycle T7, the sa_2si_d[31:0] signal is not routed through multiplexer 321 to register 311. Rather, the contents of register 312 (i.e., the fourth data value D4) are routed through multiplexer 321 to register 311. As a result, the fourth data value D4 is again latched into register 311 at the rising edge of cycle T7. During cycle T7, the fourth data value D4 is therefore provided to slave device 202.

Also during cycle T6, slave device 202 provides a READY acknowledge signal, thereby indicating that slave device 202 will be ready to receive the next data value during the next cycle T7. At the rising edge of cycle T7, the READY acknowledge signal is latched by flip-flop 334 and routed to fly-by read output controller 302 as the mntr_ack signal. In response to the asserted mntr_ack signal, fly-by read output controller 302 causes the si_2sa_flyby_rd signal to transition to a logic high state.

Thus, during cycle T7, slave device 202 uses the previously latched fourth byte-enable signal B4. At this time, the fourth data value D4 is written to fourth address A4 at the byte location(s) identified by byte-enable signal B4 in slave device 202.

Fly-by read output controller 302 de-asserts the si_2sa_flybyBE_valid signal during cycle T7, thereby indicating that the byte enable signal provided by byte-enable buffer/controller 303 is not valid. Thus, peripheral device 231 does not update the byte count at this time.

Due to the de-assertion of the si_2sa_flyby_rd signal during cycle T6, peripheral device 231 provides the fifth data value D5 as the sa_2si_d[31:0] signal during cycle T7. This effectively makes peripheral 203 wait before providing more data, as requested by slave device 202. At the rising edge of cycle T8, the sa_2si_d[31:0] signal is routed through multiplexer 321 and latched into register 311.

Due to the WAIT acknowledge signal (ip_2si_ack=WAIT) provided in cycle T5, master interface 212 repeats the fifth address A5 and fifth byte-enable signal B5 on peripheral bus 204 during cycle T7. The fifth address A5 and the fifth byte-enable signal B5 are latched by slave device 202 at the rising edge of cycle T8.

Also during cycle T7, slave device 202 provides a WAIT acknowledge signal, thereby indicating that slave device 202 is not ready to accept the next data value. At the rising edge of cycle T8, the WAIT acknowledge signal is latched by flip-flop 334 and routed to fly-by read output controller 302 as the mntr_ack signal. In response to the de-asserted mntr_ack signal, fly-by read output controller 302 causes the si_2sa_flyby_rd signal to transition to logic low state.

During cycle T8, the fifth data value D5 is provided to slave device 202. However, because slave device 202 is not ready to receive data during this cycle, the fifth data value D5 is ignored by slave device during cycle T8.

Fly-by read output controller 302 continues to assert the si_2sa_flybyBE_valid signal during cycle T8, thereby indicating that the byte enable signal provided by byte-enable buffer/controller 303 is valid. Thus, at the rising edge of cycle T9, peripheral device 231 receives the fifth byte-enable signal B5, and in response, updates the byte count. As described below, slave device 202 will use the fifth byte-enable signal B5 when it is ready to receive the fifth data value D5.

Processing continues in a manner consistent with the above description, with the fifth data value D5 being written to address A5, byte location B5 in slave device 202 during cycle T10, the sixth data value D6 being written to address A6, byte location B6 in slave device 202 during cycle T11, and the seventh data value D7 being written to address A7, byte location B7 in slave device 202 during cycle T13. Note that during cycle T11, master interface 212 provides the last address A7 and the last byte-enable signal B7 of the fly-by read transfer, and asserts the ip_2si_last signal. During cycle T13, the si_2sa_lastBE signal is generated from ip_2Si_last being asserted. This indicates the end of the fly-by read operation. At this time, peripheral device 231 updates the final byte count, which is the total byte count being transferred during fly-by access. At the rising edge of cycle T12, master interface 212 de-asserts the dma_2si_flyby_rd signal, thereby indicating the end of the participation of master interface 212 in the fly-by read operation.

Note that in the described example, the write operations to slave device 202 do not occur on consecutive clock cycles, because slave device 202 issues WAIT acknowledge signals. However, it is understood that if slave device 202 is ready, then data values can be written to slave device 202 during consecutive clock cycles.

In the foregoing manner, fly-by write and read operations are enabled by the present invention. Advantageously, data values can be transferred between slave device 202 and fly-by slave device 203 without having to buffer the data values in master device 201. As a result, the time required to perform such data transfers is reduced Although the present invention has been described in connection with several embodiments, it is understood that this invention is not limited to the embodiments disclosed, but is capable of various modifications which would be apparent to one of ordinary skill in the art. Thus, the invention is limited only by the following claims.

What is claimed is:

1. A system comprising:
   a peripheral bus;
   a bus master coupled to the peripheral bus;
   a bus slave coupled to the peripheral bus;
   a fly-by slave interface coupled to the peripheral bus; and
   a peripheral device coupled to the fly-by slave interface, wherein the bus master is configured to control fly-by transfer of data between the bus slave and the peripheral device without buffering the data, and wherein the fly-by slave interface is configured to isolate the peripheral device from the peripheral bus during fly-by transfer of data between the bus slave and the peripheral device.

2. The system of claim 1, wherein the bus master is configured to read the data from the bus slave onto the peripheral bus, and the fly-by slave interface is configured to snoop the data from the peripheral bus under the control of the bus master.

3. The system of claim 1, wherein the bus master is configured to control a write operation to the bus slave on the peripheral bus, and wherein the bus master is configured to cause the fly-by slave interface to transfer data from the peripheral device to the peripheral bus during the write operation.

4. The system of claim 1, further comprising a set of dedicated lines between the bus master and the fly-by slave interface to enable the bus master to control the fly-by slave interface.

5. The system of claim 1, wherein the peripheral bus comprises a control line for carrying a control signal from the bus master to identify the last transaction of the transfer.

6. The system of claim 1, wherein the peripheral bus comprises a set of control lines for carrying control signals that provide a status of the bus slave to the fly-by slave interface during the transfer.

7. The system of claim 1, wherein the bus master comprises a direct memory access (DMA) controller.

8. The system of claim 1, wherein the bus master comprises a central processing unit (CPU).

9. The system of claim 1, wherein the bus slave comprises a memory controller.

10. The system of claim 1, wherein the peripheral device comprises an Ethernet system, a universal serial bus (USB) system, a TDM peripheral, or an asynchronous transfer mode (ATM) system.

11. The system of claim 1, wherein the bus slave is configured to provide a control signal on the peripheral bus, wherein the control signal regulates the flow of data on the peripheral bus during fly-by transfer of data between the bus slave and the peripheral device.

12. The system of claim 1, further comprising a set of lines between the fly-by slave interface and the peripheral device, wherein the set of lines include a first line configured to carry a signal that indicates a fly-by read operation, and a second line configured to carry a signal that indicates a fly-by write operation.

13. The system of claim 4, wherein the dedicated lines comprise:
   a first line for carrying a first control signal to identify a fly-by transfer of data from the bus slave to the fly-by slave interface;
   a second line for carrying a second control signal to identify a fly-by transfer of data from the fly-by slave interface to the bus slave; and
   a third line for carrying a third control signal to identify an end of a fly-by transfer of data between the bus slave and the fly-by slave interface.

14. The system of claim 11, wherein the control signal defines a ready state, wherein the bus slave is configured to provide data on the peripheral bus or receive data from the peripheral bus when the control signal defines the ready state.

15. The system of claim 12, wherein the set of lines further includes a third line configured to carry a signal that indicates a last byte enable of a fly-by transfer.

16. The system of claim 14, wherein the control signal further defines a wait state, wherein the bus slave neither provides data on the peripheral bus nor receives data from the peripheral bus when the control signal defines the wait state.

17. A method of performing a fly-by write operation on a peripheral bus, the method comprising:
   providing an activated fly-by write enable signal from a master device to a fly-by slave interface;
   providing read addresses from the master device to a slave device on the peripheral bus;

retrieving fly-by write data values from the slave device in response to the read addresses;

providing the fly-by write data values from the slave device to the peripheral bus;

activating a ready signal on the peripheral bus with the slave device, wherein the ready signal is activated on the peripheral bus when the slave device provides a fly-by write data value to the peripheral bus;

retrieving the fly-by write data values from the peripheral bus with the fly-by slave interface in response to the activated fly-by write enable signal and the activated ready signal; and providing the fly-by write data values from the fly-by slave interface to a peripheral device.

18. The method of claim 17, further comprising activating a wait signal on the peripheral bus with the slave device, wherein the slave device does not provide fly-by write data values to the peripheral bus when the wait signal is activated.

19. The method of claim 17, wherein the slave device provides the fly-by write data values to the peripheral bus in a synchronous manner.

20. The method of claim 17, further comprising activating a control signal on the peripheral bus with the master device to identify a last transaction of the fly-by write operation.

21. The method of claim 17, further comprising activating a fly-by write control signal with the fly-by slave interface to indicate the fly-by write operation, wherein the fly-by write control signal is provided from the fly-by slave interface to the peripheral device.

22. The method of claim 18, wherein the master device provides new addresses on the peripheral bus in response to the activated ready signal, and wherein the master device does not provide new read addresses to the peripheral bus in response to the activated wait signal.

23. The method of claim 19, wherein the slave device provides the ready signal to the peripheral bus in a synchronous manner, and the master device provides the read addresses to the peripheral bus in a synchronous manner.

24. The method of claim 21, further comprising generating a control signal with the fly-by slave interface to indicate a last valid byte enable of the fly-by write operation, wherein the control signal is provided from the fly-by slave interface to the peripheral device.

25. The method of claim 22, wherein the master device provides byte enable signals on the peripheral bus in response to the activated ready signal, and wherein the master device does not provide new byte enable signals on the peripheral bus when the wait signal is activated.

26. A method of performing a fly-by read operation on a peripheral bus, the method comprising providing an activated fly-by read enable signal from a master device to a fly-by slave interface;

providing fly-by read data values from a peripheral device to the fly-by slave interface;

providing write addresses from the master device to a slave device on the peripheral bus;

activating a ready signal on the peripheral bus with the slave device, wherein the ready signal is activated on the peripheral bus when the slave device has received a fly-by read data value from the peripheral bus;

providing the fly-by read data values from the fly-by slave interface to the peripheral bus in response to the activated ready signal; and writing the fly-by read data values on the peripheral bus to the slave device at addresses corresponding to the write addresses.

27. The method of claim 26, further comprising activating a wait signal on the peripheral bus with the slave device, wherein the fly-by slave device does not write fly-by read data values on the peripheral bus when the wait signal is activated.

28. The method of claim 26, wherein the slave device receives the fly-by read data values from the peripheral bus in a synchronous manner.

29. The method of claim 26, further comprising activating a control signal on the peripheral bus with the master device to identify a last transaction of the fly-by read operation.

30. The method of claim 26, further comprising activating a fly-by read control signal with the fly-by slave interface to indicate the fly-by read operation, wherein the fly-by read control signal is provided from the fly-by slave interface to the peripheral device.

31. The method of claim 27, wherein the master device does not provide new write addresses to the peripheral bus when the wait signal is activated.

32. The method of claim 28, wherein the slave device provides the ready signal to the peripheral bus in a synchronous manner, and the master device provides the write addresses to the peripheral bus in a synchronous manner.

33. The method of claim 30, further comprising generating a control signal with the fly-by slave interface to indicate a last valid byte enable of the fly-by read operation, wherein the control signal is provided from the fly-by slave interface to the peripheral device.

34. The method of claim 31, wherein the master device provides byte enable signals on the peripheral bus in response to the activated ready signal, and wherein the master device does not provide new byte enable signals on the peripheral bus when the wait signal is activated.

* * * * *